(12) United States Patent
Stevenson et al.

(10) Patent No.: US 7,514,647 B2
(45) Date of Patent: Apr. 7, 2009

(54) PHASE CHANGE RESISTANCE SPOT WELDING TIP

(75) Inventors: Robin Stevenson, Bloomfield, MI (US); Pei-Chung Wang, Troy, MI (US)

(73) Assignee: General Motors Corporation, Detroit, MI (US)

(*) Notice: Subject to any disclaimer, the term of this patent is extended or adjusted under 35 U.S.C. 154(b) by 236 days.

(21) Appl. No.: 11/008,427

(22) Filed: Dec. 9, 2004

(65) Prior Publication Data

US 2006/0124697 A1    Jun. 15, 2006

(51) Int. Cl.
 B23K 11/30    (2006.01)
 B23K 35/04    (2006.01)
(52) U.S. Cl. .................................. 219/119; 219/120
(58) Field of Classification Search .............. 219/119, 219/120
 See application file for complete search history.

(56) References Cited

U.S. PATENT DOCUMENTS 3,909,581 A * 9/1975 Stone et al. ............... 219/120
5,200,594 A * 4/1993 Okada et al. ............ 219/121.52
5,908,567 A * 6/1999 Sakuragi et al. ........ 219/121.52

OTHER PUBLICATIONS

Srikunwong, C., et al., Numerical Simulation of Resistance Spot Welding Process Using FEA Technique, 13th International Conf. on Computerization of Welding, Jun. 18, 2003, 12p.
NovaCast—AB, Introduction to Thermal Analysis of Metals, 2002, 4 pages (http://www.novacast.se/about_thermal_analysis.htm).
ANSYS Technical Support, Resistance Spot Welding Simulation with ANSYS 7.0, Oct. 2002, 25 pages (slides).

* cited by examiner

*Primary Examiner*—Kevin P Kerns

(57) ABSTRACT

An improved spot welding tip is adapted for welding a set of adjacent members within a heated zone during a welding program, wherein a quantity of energy is produced, and for reducing the final base temperature of the heated zone. The tip presents a distal engaging surface for contacting one of the members and defines a preferably inner space located a preferred distance from the surface. A phase changing body is releasably retained within the space. At least a portion of the body changes from a first phase to a second phase by absorbing at least a portion of the heat energy during the welding program.

17 Claims, 4 Drawing Sheets

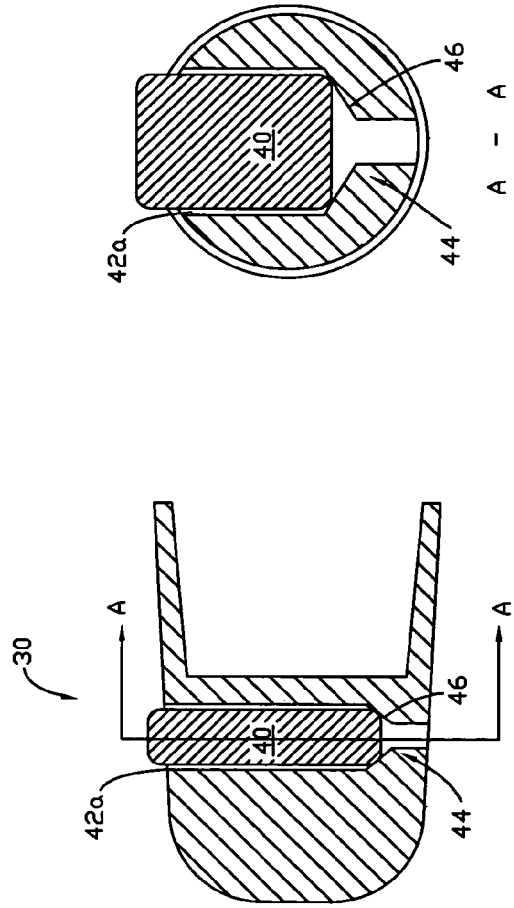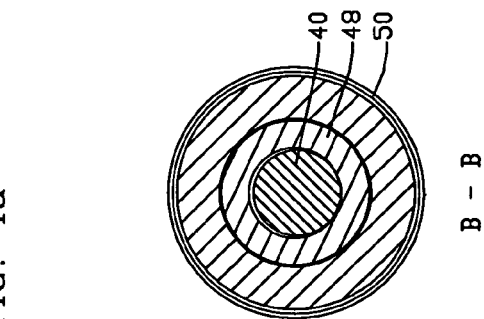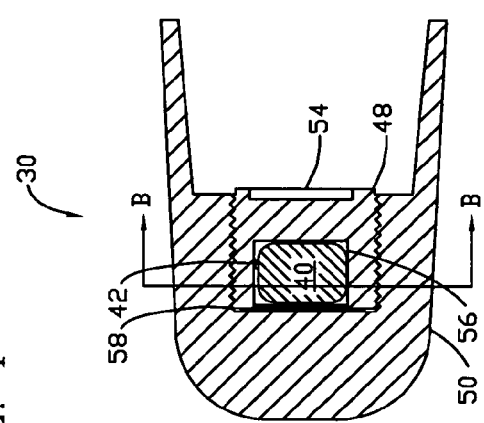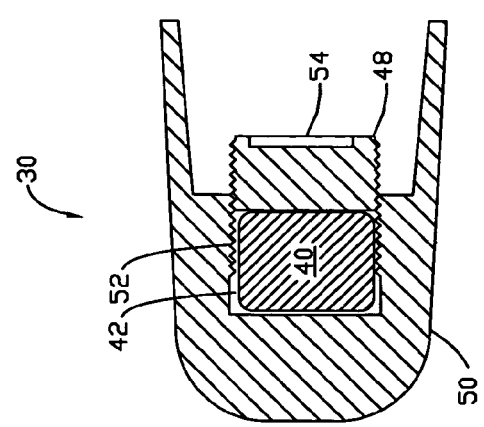

PHASE CHANGE RESISTANCE SPOT WELDING TIP

BACKGROUND OF THE INVENTION

1. Field of the Invention

The present invention relates to resistance spot welding devices, and more particularly to an electrode system having an improved tip configuration for absorbing a quantity of heat energy.

2. Discussion of Prior Art

Two-component electrode welding devices are used in various industrial applications, including automotive assembly. These devices typically include a conductive shank removably connected to a welding gun, and a conductive welding cap removably connected to the distal end of the shank. As is well known in the art, these devices function to transmit electric currents through adjacently placed subject members, so that the device and members cooperatively generate a quantity of heat energy and a spot weld is produced between the members. During a welding program, the production of heat energy creates a heated zone having initial and final base temperatures, which correlate to the maximum temperature achieved. For example, in a recent study this zone was exemplarily modeled to reflect a spot-weld center temperature of aprx. 1500° C., a 5-cycle temperature of aprx. 400° C. at a radius of 4 mm, and 100° C. at a radius of 8 mm, and a 30-cycle temperature of aprx. 1000° C. for 4 mm radius and 200° C. for 8 mm. The total amount of heat energy produced is proportional to the weld current (i) squared times the total electrical resistance (R) of the parts to be welded times the time (t) that the weld current is on ($\Delta H = i^2 \times R \times t$), and typically is aprx. equal to 1 kJ for large-scale programs such as automobile assembly.

The proximity of the welding cap to the heat source results in the transfer of significant amounts of heat energy to the cap and excessive cap temperatures. The resultant heat absorption and excess cap temperatures cause deformation and replacement. Another resultant from the over-heating of caps is the tendency of the cap to "pick-up" material from, or stick to, the subject members. This tendency further causes the cap to change its configuration and reduces its efficiency. Yet another issue associated with the heating of welding caps and their ensuing deformation is the resulting reduced weld nugget diameters and joint tensile strengths.

Conventional cooling systems have been developed to counteract these concerns by increasing the rate of heat energy loss of the cap and, thereby, retarding or reducing the maximum achievable temperature. Where these systems are not properly configured or malfunction, inefficiency concerns arise and, the cooling system may be rendered ineffective. To cure these conditions, the system must be dismantled from the welding device and reconfigured, repaired or replaced. This results in an inconvenience to the worker and down time to the entire process. Even where properly functioning, however, these conventional cooling systems do not eradicate degradation of the welding cap due to heat stresses.

Accordingly, there is a need in the art for an apparatus for and method of more reliably and further reducing the heat absorption and final base temperature of a resistance spot welding cap.

BRIEF SUMMARY OF THE INVENTION

Responsive to these and other concerns caused by conventional welding devices, the present invention concerns an improved configuration for reducing the final base temperature of a heated welding cap. Among other things, the invention provided hereof, is useful for increasing the effectiveness and durability of a welding cap, for reducing down time associated with replacing the cap, and improving the quality of weld produced by the cap.

A first aspect of the present invention concerns an apparatus adapted for welding adjacent members during a welding cycle, wherein the apparatus and members cooperatively generate a quantity of heat energy within a heated zone, so that the temperature of the zone rises from an initial base temperature to a final base temperature, and for reducing the final base temperature. The apparatus includes an engaging element presenting a distal engaging portion located within the heated zone. The distal engaging portion presents a distal surface configured to contact one of the members, a phase changing body spaced from the surface, and a remaining sub-portion. The body has a phase changing point greater than the initial base temperature and not greater than the final base temperature of the zone, during the welding cycle.

A second aspect of the present invention concerns an apparatus adapted for welding adjacent members during a welding cycle, wherein the apparatus and members cooperatively generate a quantity of heat energy within a heated zone, so that the temperature of the zone rises from an initial base temperature to a final base temperature, and for reducing the final base temperature. The apparatus includes a tubular shank, a welding cap removably connected to the shank, located within the heated zone, and presenting an exterior engaging surface for contacting one of the members, and a phase changing body presenting an initial body volume. The cap includes at least two removably interconnected parts cooperatively defining an enclosed space configured to retain the body. The space presents a volume greater than the body volume, so as to enable the body to expand therein. The body is spaced not less than 6 mm from the engaging surface; and presents a phase changing point greater than the initial base temperature and not greater than the final base temperature of the zone, so that at least a portion of the body changes phases during the welding cycle.

A third aspect of the present invention concerns a welding component adapted for removably interconnecting to an apparatus and cooperatively welding adjacent members during a welding cycle, wherein a quantity of heat energy is generated and the component temperature rises from an initial component temperature to a final component temperature, and for reducing the final component temperature. The component includes a shell defining both a space and a distal surface configured to contact one of the members, and a phase changing body spaced from the surface, retained at least partially within the space, and having a phase changing point greater than the initial component temperature and not greater than the final component temperature.

A fourth aspect of the present invention concerns a method for welding adjacent members, wherein a quantity of heat energy is generated within a heated zone, so that the temperature of the zone rises from an initial base temperature to a final base temperature, and for reducing the final base temperature. The method includes the steps of securing a distal portion of an engaging element within the heated zone and engaging one of a set of adjacent members with the distal portion, securing a body having a phase changing point greater than the initial base temperature and less than the final base temperature within the heated zone, and absorbing a portion of the heat energy with the body, so as to change at least a portion of the body from a first phase to a second phase, during a welding cycle.

It will be understood and appreciated that the present invention provides a number of advantages over the prior art, including, for example, providing a phase changing body capable of absorbing heat energy without increasing the temperature of the welding device. This invention increases the efficiency of the welding device by reducing the losses associated with excess temperatures. The present invention also provides a more functional weld.

Other aspects and advantages of the present invention will be apparent from the following detailed description of the preferred embodiment(s) and the accompanying drawing figures.

BRIEF DESCRIPTION OF THE SEVERAL VIEWS OF THE DRAWING

A preferred embodiment of the invention is described in detail below with reference to the attached drawing figures, wherein:

FIG. 4 is a cross-sectional fragmentary view of a two-component electrode in accordance with a second preferred embodiment of the present invention, and two adjacent subject members, particularly illustrating the slot and through-hole defined by the cap;

FIG. 4a is a cross-sectional view of the electrode shown in FIG. 4;

FIG. 5 is a cross-sectional fragmentary view of the cap in accordance with a third preferred embodiment of the present invention, particularly illustrating the cap shell and removable insert;

FIG. 6 is a cross-sectional fragmentary view of the cap in accordance with a fourth preferred embodiment of the present invention, particularly illustrating a seat defined by the removable insert;

FIG. 6a is a cross-sectional view of the cap shown in FIG. 6;

DETAILED DESCRIPTION OF THE INVENTION

Figure 1:
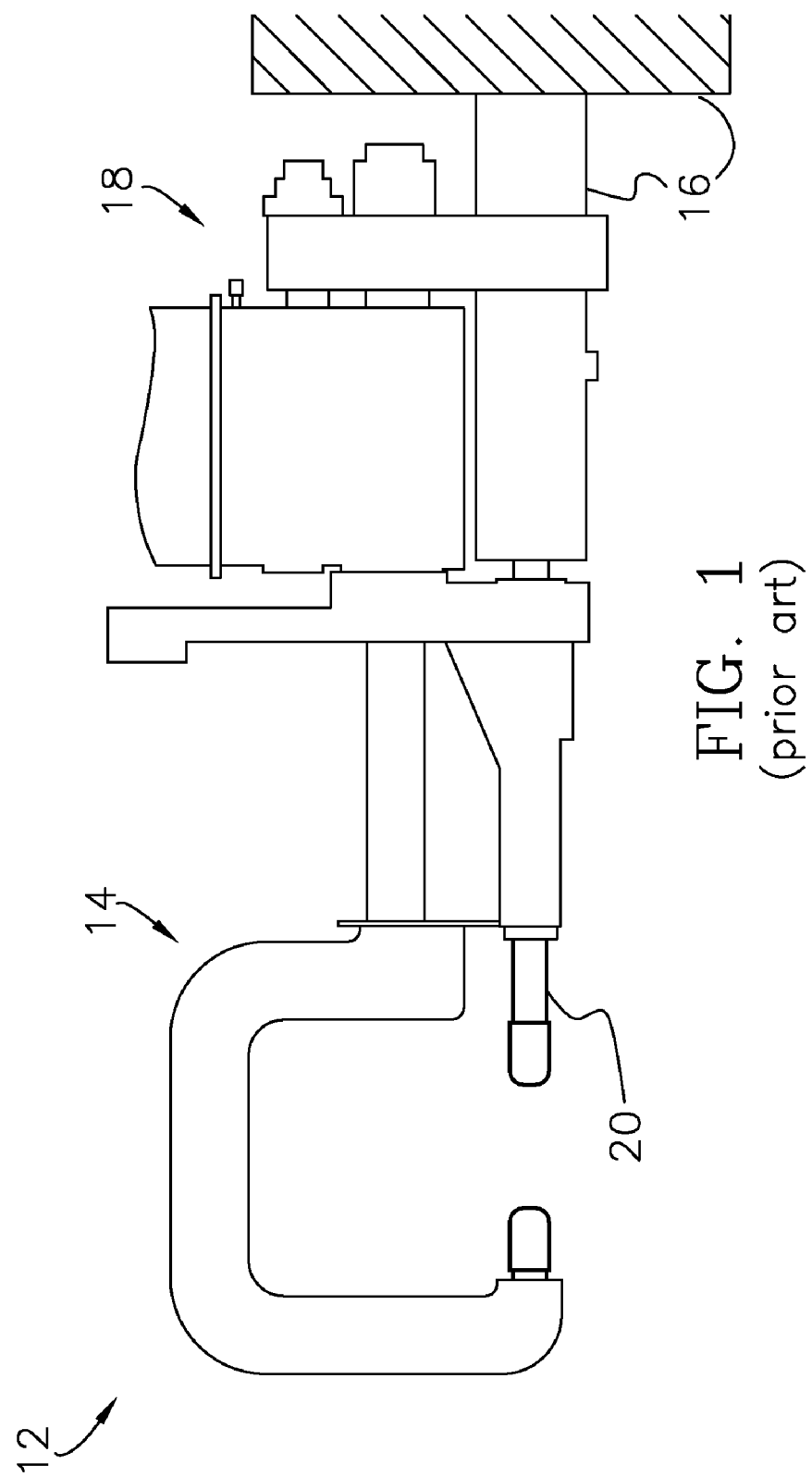
FIG. 1 is an elevation view of a conventional welding device.

The present invention concerns an improved spot-welding electrode tip 10 adapted for use with a welding device 12, such as the conventional welding device shown in FIG. 1. The improved tip 10, however, is not limited in use to the device illustrated and described herein, and can be utilized with other welding configurations and apparatuses wherein reducing the maximum achieved temperature is desired.

Figure 2:
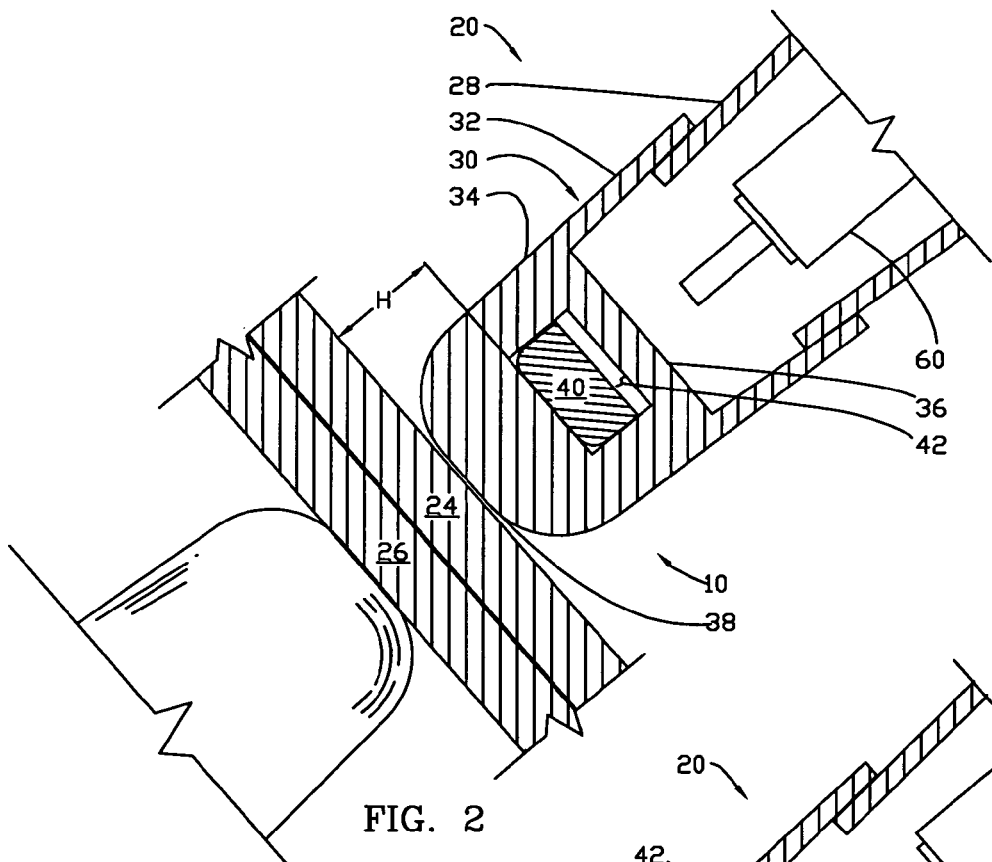
FIG. 2 is a cross-sectional fragmentary view of a two-component electrode in accordance with a first preferred embodiment of the present invention, and two adjacent subject members, particularly illustrating the phase changing body in an initial solid condition.

As shown in FIG. 1, the welding device 12 typically includes a welding gun 14, a structural base 16, electrical and mechanical apparatus 18 for maneuvering the gun 14 to a desired location, and at least one electrode 20 removably attached to the gun 14. Shown in FIG. 2 is an enlarged view of the press weld configuration of the device, wherein upper and lower electrodes are coaxially aligned and brought to oppositely bear against two separate members. The upper and lower electrodes are generally identical in structure and function, and therefore only upper electrode 20 is described in detail herein. As is typical, the welding device 12 functions to produce a spot-weld 22 between the members (see FIG. 3), and more preferably between planar sheets 24,26 of material, such as steel, stainless steel or aluminum. For example, in an automotive setting, the device 12 can be used to press weld multiple body panels such as floor pans, deck lids, hoods, doors, and engine compartments. Suitable sheets 24,26 are determined based in part on the melting range, thermal conductivity, and electrical resistance of the material and the electrical capacity of the gun 14.

As shown in FIG. 2, the preferred electrode 20 includes a shank 28 removably attached to the gun 14, and a welding cap 30 removably attached to the distal end of the shank 28. Thus, the preferred electrode 20 presents a two-component electrode system. The illustrated cap 30 presents a female configuration, so that the shank 28 is slidably insertable therein. However, a male cap configuration may equally be utilized with the present invention. The non-equivalent tapers of the shank 28 and cap 30 result in the primarily elastic deformation of the shank 28, which applies a holding force to the cap 30.

The cap 30 consists of integrally formed tubular skirt and solid head portions 32,34. The interface of the adjacent skirt and head portions 32,34 forms an exposed interior surface 36. The head portion 34 presents one of a plurality of geometric shapes at a distal engaging surface 38 opposite the interior surface 36 to promote contact with the adjacent member 24. For example, the cap 30 may present a flat, domed, offset, truncated or otherwise irregular contact configuration. The skirt portion 32 is typically configured to space the interior surface 36 approximately 4 mm from the distal end of shank 28.

The shank 28 typically presents a tubular configuration for attachment to an electrode holder (not shown) of the gun 14. The shank 28 shown in FIGS. 2-6 presents a straight longitudinal axis and tapered wall configuration; however, spade, crank, single bend, or double bend configurations may also be utilized. Finally, the electrode 20 is necessarily formed of conductive material, such as a copper base alloy, suitable for efficiently transmitting the current, and transferring a forging pressure to the members 24,26.

Turning to the configuration of the present invention, the welding cap 30 (or relative distal engaging portion of a single-component electrode) is preferably modified to accommodate a phase changing body 40 preferably in contact therewith. As shown in FIGS. 2-7, the body 40, more preferably, replaces a section of the head portion 34, so that the cap 30 defines a space 42 wherein the body 40 is at least initially retained during operation. For example, in the preferred embodiment shown in FIG. 4 a slot 42a is defined by the cap 30 and configured to receive the phase changing body 40. The body 40 is preferably one of a plurality of replaceable pellets. More preferably, the slot 42a cooperatively defines a through-hole 44 configured to allow the migration of the body 40 through the cap 30 in a liquid condition. The through-hole 44 defines a funnel portion 46 that promotes migration and reduces the likelihood of pooling liquid in the slot 42a. Finally, a mechanism (not shown) can be provided for automatically feeding the pellet into the slot 42a and collecting the liquid during the welding cycle. Thus, it shall be appreciated that this configuration enables the replacement of the body 40 without disassembly of the component parts of the welding device 12.

Returning to the preferred embodiment shown in FIG. 2, the cap 30, more preferably, defines an inner space 42, so that the body 40 is hermetically enclosed. The space 42 is configured to accommodate the size and shape of the body 40, and necessarily presents a volume not less than the volume of the body 40. The volume of the space is not less than the anticipated volume of the liquid, and where the body 40 expands during a solid to liquid phase shift, not less than 110% of the volume of the solid body 40.

To facilitate replacement of the body 40, the cap 30 preferably includes two interconnected parts 48,50 as best shown in FIGS. 5 and 6. The parts 48,50 cooperatively define the inner space 42 so that the body 40 is accessible upon the disassembly of the parts 48,50. More preferably, the first part 48 presents a threaded insert that is coaxially aligned with a tapped hole 52 defined by the second part 50 that forms an outer cap shell. The preferred insert 48 defines a screwdriver slot 54 to facilitate manual adjustment by an operator. It shall be appreciated that by altering the position of the insert 48, the volume of the space 42 can be adjusted to accommodate various bodies of gradually differing thickness or expansion coefficients. So as not to prevent the removal of the body 40 after resolidification, however, it is further appreciated that the preferred body 40 in FIG. 5 is formed of material that shrinks during a liquid to solid phase shift.

Alternatively, the preferred insert 48 may additionally define a seat 56 that configures to the body 40. As shown in FIGS. 6 and 6a, the seat 56 preferably extends to the cap shell 50 and circumscribes the body 40, so that the body 40 is substantially separated from the threaded interface in a fully inserted position. More preferably, the seat 56 engages a compressible pad 58 attached to the longitudinally perpendicular surface of the tapped hole in the fully inserted position, so that the body 40 is further sealed from the threaded interface.

Figure 3:
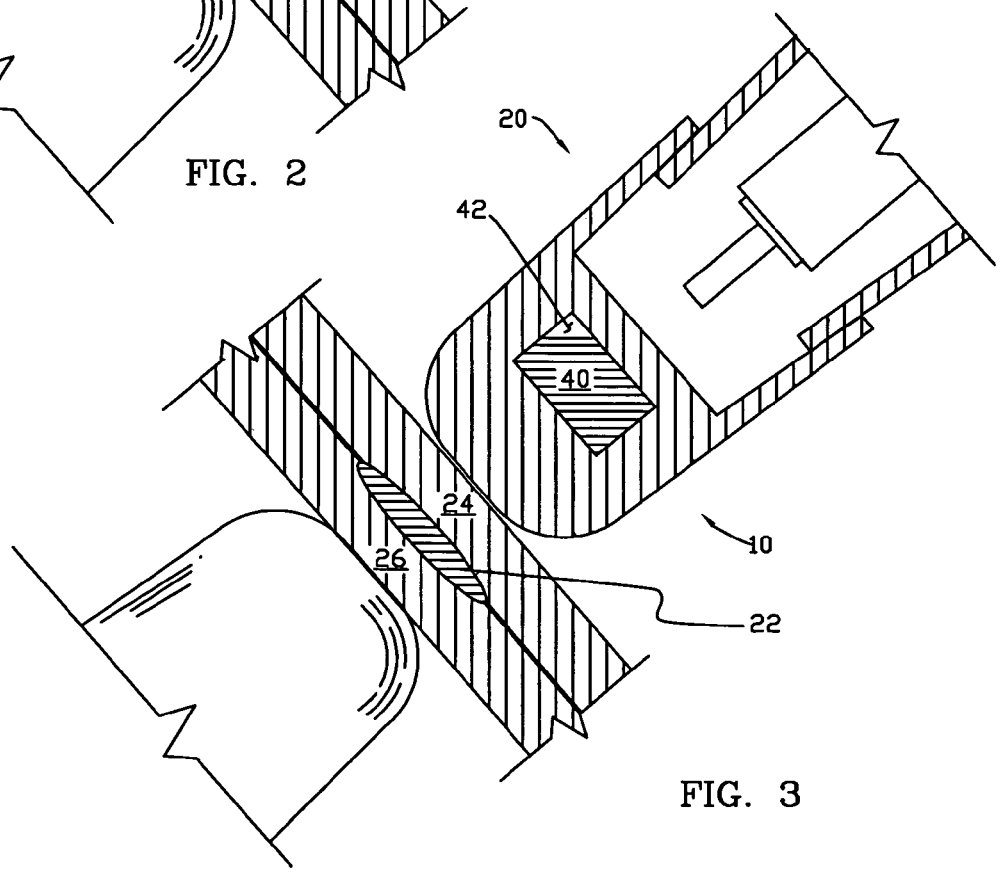
FIG. 3 is a cross-sectional fragmentary view of the two-component electrode shown in FIG. 2, particularly illustrating the phase changing body in a liquid condition and the subject members welded together.

As previously mentioned, at least a portion of the body 40 is configured to transition from a first phase to a second phase during a particular welding cycle. For example, as shown in FIGS. 2 and 3, the body 40 may be fusible, so as to transition from an initial solid state at room temperature to a liquid state during the welding cycle. The body 40 in this configuration presents a melting temperature greater than the initial base temperature and not greater than the final base temperature of a heated welding zone defined by the three-dimensional space wherein the temperature is not less than 10% of the maximum spot weld temperature during the welding cycle. Within the zone, it is appreciated that the heat energy produced by the welding cycle has not substantially dissipated, and can, therefore, be more efficiently absorbed. Thus, at least a portion of the body 40 is preferably located within the zone, and more preferably located within or adjacent the cap 30, so as to enable functionality within truncated zones that typically result from cooling systems. The body 40 is spaced a minimum functional distance, H, from the contact engaging surface 38 of the cap 30 (see FIG. 2); more preferably, the body is spaced not less than 4 mm, and most preferably, not less than 6 mm from the surface 38.

In the preferred embodiments shown in FIGS. 2-6, the quantity of additional heat energy absorption by the body 40 due to the latent heat absorbed during melting is equal to the product of the mass (kg) of the body 40 and the latent heat of fusion, $H_f$(kJ/kg) of the body material. Since the mass of the body 40 is better defined in terms of its density and the available volume of the space 42, a better metric to characterize the efficiency of alternate body material is the volumetric heat energy absorption rate (kJ/cm$^3$), which is the product of the density, $\rho$ (g/cm$^3$) and the latent heat of fusion, $H_f$ (kJ/kg) of the body material. Accordingly, the body 40 is formed of material having a preferably high heat of absorption rate and an operable melting temperature, with a lower melting temperature being preferred. Finally, the body 40 may consist of a pure material or be of eutectic composition so that heat absorption and phase transition occurs at a constant temperature.

Suitable materials for the body 40 include conventional fusible alloys having low melting points, such as certain Bismuth alloys, Cadmium alloys, Tin alloys (solder), Lead alloys, Zinc alloys, Indium alloys and Gallium alloys, as well as other low-melting-point-room-temperature solids such as beeswax or paraffin. For example one such suitable material is formed of a Bismuth alloy consisting essentially of 12.5% Tin (Sn), 25% Lead (Pb), 50% Bismuth (Bi), and 12.5% Cadmium (Cd); and has an $H_f$ approximately equal to 40 kJ/kg, a $\rho$ approximately equal to 9.7 g/cm$^3$, a melting temperature approximately equal to 70° C. (158° F.), and a volumetric heat absorption rate of 0.388 kJ/cm$^3$. This exemplary alloy is better known and readily available as Wood's Metal. It is appreciated by those ordinarily skilled in the art that the specific heats of metallic systems, both liquid and solid, tend to be similar on a per mole basis (Law of Dulong and Petit). Hence the efficiency of heat removal of the low melting point alloy due to specific heat effects will be similar to that of the cap 30 provided its density is similar to the cap density. Thus, the introduction of the low melting point alloy adds an additional increment of heat absorption through its latent heat contribution without markedly decreasing the specific heat contribution of the overall cap 30.

Figure 7:
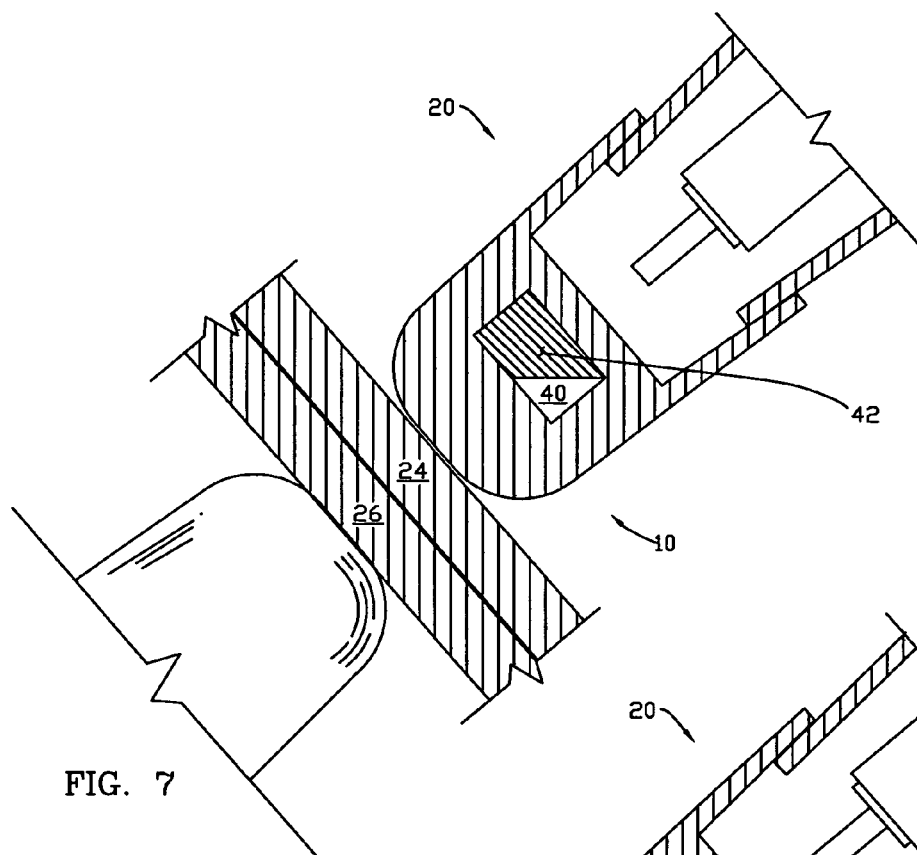
FIG. 7 is a cross-sectional view of the cap shown in FIG. 2, particularly showing an initially liquid body.
Figure 7A:
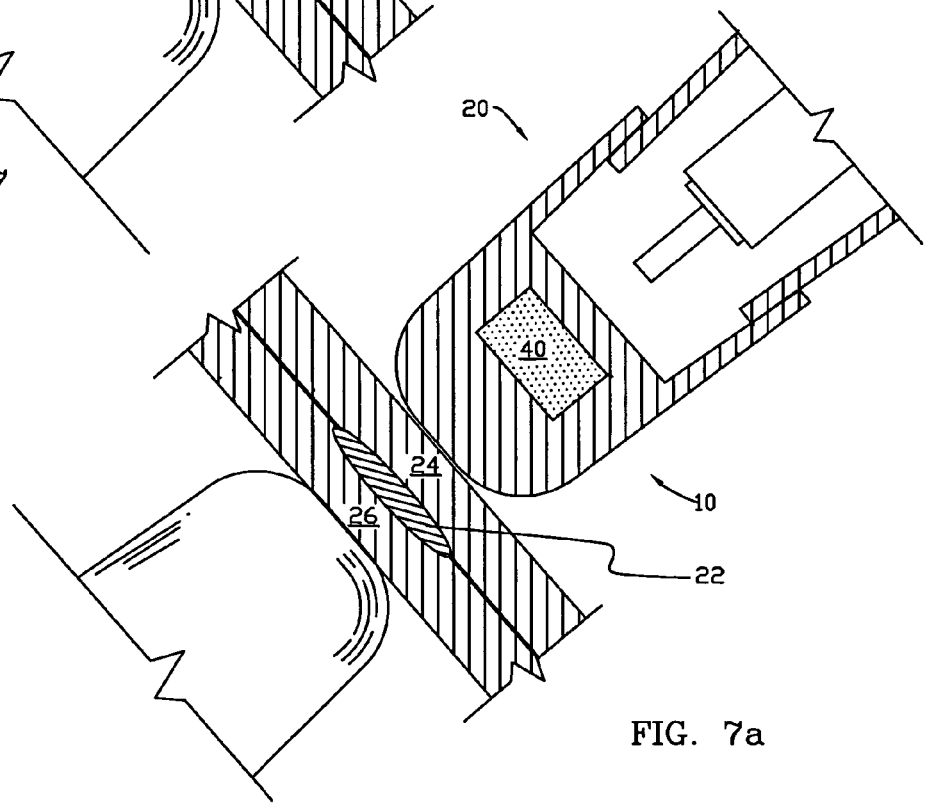
FIG. 7a is a cross-sectional view of the cap and body shown in FIG. 7, particularly showing the body in a gaseous phase.

Alternatively, the phase changing body 40 may be liquid at room temperature, and present an operable boiling point temperature within the range of heated zone temperatures. As shown in FIGS. 7 and 7a, the cap 30 (or remainder of the distal engaging portion of a one-component electrode) in this configuration, presents a fracture strength greater than the vapor pressure exerted upon it by the resultant gaseous body or portion thereof. As such, a low vapor pressure alloy is more preferably utilized, and the inner defined space 42 is located and configured to present sufficient cap wall thickness. It is appreciated by those ordinarily skilled in the art that the relatively significant increase in absorbed heat during vaporization versus fusion, may enable a smaller volume of liquid to absorb more heat energy than the previously discussed solid counterparts. An example of a suitable low boiling point-room temperature liquid presents a boiling point of 78° C. (172.4° F.), an $H_v$ approximately equal to 838 kJ/kg, and a $\rho$ approximately equal to 0.789 g/cm$^3$ (at aprx. 21° C.), and is better known and readily available as Ethanol.

Finally, not withstanding limitations due to cap size, the body 40 is preferably sized and the material is selected so that the body 40 is fully molten or vaporized by the end of the overall welding program, and therefore, only incrementally melts or vaporizes during a particular welding cycle. For peak effectiveness in reducing the maximum temperature attained by the weld tip, the phase change material should be fully changed only at the highest temperature achieved by the tip. Alternatively, the body 40 can be repeatedly liquefied and then re-solidified over multiple welding cycles that each contain a sufficient cooling period. During the cooling period the heat source is removed and the absorbed heat energy within the body 40 is allowed to dissipate to the coolant circulated through supply tube 60 and removed through the annular gap formed between supply tube 60 and shank 28.

Thus, a method for welding adjacent members, and reducing the final base temperature within a heated zone includes a first step of securing a welding cap or the distal portion of an engaging element within the heated zone and engaging one of a set of adjacent members. At a second step, a body having a phase changing point greater than the initial base temperature and not greater than the final base temperature of the zone is secured within the heated zone. More preferably, the body is removably retained within an inner space defined by the cap and is spaced not less than 4 mm from the members. At a third step, the body absorbs a portion of the heat energy, so that said at least portion of the body changes from a first phase to a second phase during a welding cycle. At a fourth and final step, the welding cycle is terminated and the body is allowed to cool and revert back to the first phase.

Alternatively, at the first step, a plurality of sets of adjacent members can be consecutively engaged during a corresponding plurality of welding cycles and at the third step, a separate portion of the heat energy can be absorbed by a portion of the body during each cycle; or, the plurality of sets can be consecutively engaged during a corresponding plurality of welding cycles, wherein each welding cycle includes a cooling period, and a separate portion of the heat energy can be absorbed to change at least a portion of the body from the first phase to the second phase, dissipate said separate portion of the heat energy, and allow said at least portion of the body to change from the second phase to the first phase during each cooling period.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An apparatus adapted for spot welding adjacent members during a welding cycle, wherein the apparatus and members cooperatively generate a quantity of heat energy within a heated zone, so that the temperature of the zone rises from an initial base temperature to a final base temperature, and for reducing the final base temperature, said apparatus comprising:
    a spot-welding electrode presenting a distal engaging portion formed of a non-refractory metal, and located within the heated zone, said distal engaging portion presenting a distal surface configured to contact and bear against one of the members, and defining a longitudinal portion depth and a maximum portion width; and
    a phase changing body located within the portion and spaced from the surface a distance not less than 4 millimeters,
    said body having a phase changing point greater than the initial base temperature and not greater than the final base temperature of the zone; during the welding cycle, a longitudinal depth not less than a quarter of the portion depth, and a width not less than half of the portion width.

2. The apparatus as claimed in claim 1,
    said body being removably coupled to an insert spaced from the surface.

3. The apparatus as claimed in claim 1,
    said body having a melting point greater than the initial base temperature and not greater than the final base temperature of the zone, so that at least a portion of the body is solid at the initial base temperature and liquid at the final base temperature.

4. The apparatus as claimed in claim 3,
    said body being formed of a eutectic alloy.

5. The apparatus as claimed in claim 3,
    said body having a volumetric heat absorption rate not less than 0.25 kJ/cm$^3$.

6. The apparatus as claimed in claim 5,
    said body being formed of a material selected from the group consisting of Bismuth alloys, Cadmium alloys, Tin alloys, Lead alloys, Zinc alloys, Indium alloys, and Gallium alloys.

7. The apparatus as claimed in claim 6,
    said body being formed of Wood's Metal Alloy.

8. The apparatus as claimed in claim 1,
    said body being hermetically enclosed by an insert spaced from the surface and interconnected with the portion.

9. The apparatus as claimed in claim 8,
    said body having a boiling point greater than the initial base temperature and less than the final base temperature of the zone, so that at least a portion of the body is liquid at the initial base temperature and gaseous at the final base temperature.

10. The apparatus as claimed in claim 8,
    said insert defining a space configured to retain the body,
    said body presenting an initial body volume,
    said space presenting a volume not less than 110% of the body volume, so as to enable the body to expand therein.

11. The apparatus as claimed in claim 8,
    said body being hermetically enclosed by a compressible layer and an insert spaced from the surface, such that the body is spaced and disconnected from the portion.

12. The apparatus as claimed in claim 1,
    said portion defining a through-hole configured to receive and retain the body in a solid state, and allow the body to pass in a liquid state.

13. An apparatus adapted for spot welding adjacent members during a welding cycle, wherein the apparatus and members cooperatively generate a quantity of heat energy within a heated zone, so that the temperature of the zone rises from an initial base temperature to a final base temperature, and for reducing the final base temperature, said apparatus comprising:
    a tubular shank;
    a welding cap removably connected to the shank, and further comprising
        a solid head portion located within the heated zone, defining a first volume, formed of a non-refractory metal, and including at least two removably interconnected parts cooperatively defining an enclosed space, wherein only one of said parts presents an exterior engaging surface for contacting one of the members; and
    a phase changing body presenting an initial body volume not less than a quarter of the first volume,
    said space being configured to retain the body, and presenting a volume greater than 110% of the body volume, so as to enable the body to expand therein,
    said body being located within the portion, spaced not less than 6 mm from the engaging surface, and presenting a phase changing point greater than the initial base temperature and not greater than the final base temperature of the zone, so that at least a portion of the body changes phases during the welding cycle.

14. A method of resistance spot welding adjacent members, wherein a quantity of heat energy is generated within a heated zone, so that the temperature of the zone rises from an initial base temperature to a final base temperature, and for substantially reducing the final base temperature, said method comprising the steps of:

a) securing a distal portion of a spot-welding electrode within the heated zone, wherein the portion presents a first volume, and engaging one of a set of adjacent members with the distal portion, so as to produce the heated zone;

b) securing adjacent the portion and within the heated zone, a body defining a second volume not less than one quarter of the first volume and having a phase changing temperature greater than the initial base temperature and not greater than the final base temperature, and spacing the body from the members not less than 4 mm; and c) absorbing a portion of the heat energy with the body, so as to change only a portion of the body from a first phase to a second phase; during a press welding cycle.

15. The method as claimed in claim 14, step b) further including the steps of removably interconnecting the portion and body.

16. The method as claimed in claim 14, step a) further including the steps of consecutively engaging a plurality of sets of adjacent members during a corresponding plurality of welding cycles, step c) further including the steps of absorbing a separate portion of the heat energy, and changing a separate portion of the body during each cycle.

17. The method as claimed in claim 14, step a) further including the steps of consecutively engaging a plurality of sets of adjacent members during a corresponding plurality of welding cycles, wherein each welding cycle includes a cooling period, step c) further including the steps of absorbing a portion of the heat energy, changing at least a portion of the body from the first phase to the second phase, dissipating the portion of the heat energy, and allowing the at least a portion of the body to change from the second phase to the first phase, during each cycle.

\* \* \* \* \*